US009946937B2

(12) United States Patent
Faber et al.

(10) Patent No.: US 9,946,937 B2
(45) Date of Patent: Apr. 17, 2018

(54) METHOD AND CONTROL UNIT FOR RECOGNIZING A WEATHER CONDITION IN THE SURROUNDINGS OF A VEHICLE

(75) Inventors: Petko Faber, Renningen (DE); Gregor Schwarzenberg, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 202 days.

(21) Appl. No.: 14/126,885

(22) PCT Filed: May 15, 2012

(86) PCT No.: PCT/EP2012/059033
§ 371 (c)(1),
(2), (4) Date: Apr. 3, 2014

(87) PCT Pub. No.: WO2012/171739
PCT Pub. Date: Dec. 20, 2012

(65) Prior Publication Data
US 2014/0233805 A1 Aug. 21, 2014

(30) Foreign Application Priority Data

Jun. 17, 2011 (DE) .................. 10 2011 077 737

(51) Int. Cl.
*G06K 9/00* (2006.01)
*G01W 1/00* (2006.01)
(52) U.S. Cl.
CPC .......... *G06K 9/00791* (2013.01); *G01W 1/00* (2013.01); *G06K 9/00825* (2013.01)
(58) Field of Classification Search
CPC ................................. G06K 9/00791
See application file for complete search history.

(56) References Cited

U.S. PATENT DOCUMENTS 5,818,339 A * 10/1998 Giles .................. G06K 9/00791
250/339.11
6,066,177 A * 5/2000 Hatsuda .............. G06F 17/5022
703/14

(Continued)

FOREIGN PATENT DOCUMENTS

DE 19700665 7/1997
DE 10303046 10/2004

(Continued)

OTHER PUBLICATIONS

Kenji Mori, et al., "Fog density judgment by in-vehicle camera images and millimeter-wave radar data", published by Institute of Electronics, Information and Communication Engineers, Mar. 15, 2007, vol. 106, No. 605, pp. 1-9 (with English abstract).

(Continued)

*Primary Examiner* — Gandhi Thirugnanam
(74) *Attorney, Agent, or Firm* — Norton Rose Fulbright US LLP; Gerard Messina (57) ABSTRACT

A method for recognizing a weather condition in the surroundings of a vehicle. The method includes a step of ascertaining at least one imaging feature in image information. The image information represents a depiction of at least a portion of the surroundings, and the imaging feature represents a light effect on a reflective or luminescent object in the portion of the surroundings. In addition, the method includes a step of determining weather information for characterizing the weather condition based on a comparison between the imaging feature and at least one expected value.

19 Claims, 10 Drawing Sheets

(56) References Cited

U.S. PATENT DOCUMENTS

| | | | | |
|---|---|---|---|---|
| 6,831,261 | B2 * | 12/2004 | Schofield | B60N 2/002 250/205 |
| 6,873,898 | B1 * | 3/2005 | Kostadina | B60K 28/16 340/539.28 |
| 7,548,691 | B2 * | 6/2009 | Tanida | G03B 41/00 348/148 |
| 7,676,094 | B2 * | 3/2010 | Hoki | B60Q 1/085 382/104 |
| 2002/0114517 | A1 * | 8/2002 | Wolfson | G01S 13/86 382/181 |
| 2002/0181739 | A1 * | 12/2002 | Hallowell | G06T 7/2033 382/100 |
| 2003/0001509 | A1 * | 1/2003 | Leleve | B60Q 1/0023 315/77 |
| 2006/0015234 | A1 * | 1/2006 | Luh | B60W 30/182 701/51 |
| 2007/0031006 | A1 * | 2/2007 | Leleve | B60Q 1/1423 382/104 |
| 2007/0219672 | A1 * | 9/2007 | Fehr | B60W 40/08 701/1 |
| 2009/0103781 | A1 * | 4/2009 | Fleury | B60W 40/02 382/104 |
| 2009/0245657 | A1 * | 10/2009 | Osugi | G06K 9/00791 382/209 |
| 2011/0074955 | A1 * | 3/2011 | Kuehnle | G01W 1/14 348/148 |
| 2011/0242311 | A1 * | 10/2011 | Miyajima | G01C 21/3602 348/116 |
| 2012/0215378 | A1 * | 8/2012 | Sprock | E02F 9/205 701/2 |
| 2013/0039544 | A1 * | 2/2013 | Robert | G06K 9/00791 382/104 |

FOREIGN PATENT DOCUMENTS

| | | |
|---|---|---|
| DE | 102006016774 | 10/2006 |
| DE | 102007057745 | 6/2009 |
| DE | 102007062258 | 6/2009 |
| DE | 102008043737 | 5/2010 |
| DE | 102009011866 | 9/2010 |
| GB | 2337578 | 11/1999 |
| JP | 11-278182 | 10/1999 |
| JP | 11-326541 | 11/1999 |
| JP | 2003-121345 | 4/2003 |
| JP | 2006-343322 | 12/2006 |
| JP | 2008-33872 | 2/2008 |

OTHER PUBLICATIONS

International Search Report for PCT/EP2012/059033, dated Jan. 11, 2013.

Sspackman: "Thick Fog Driving Home Late at Night in Utah", You Tube, Jan. 18, 2008, XP002682528, Internet URL: http://www.youtube.com/watch?v=J11T0onarki.

Darkday1983: "Catania 2007 fahrt bei nacht", You Tube, Aug. 18, 2007, XP002682529, Internet: URL: http://www.youtube.com/watch?v=ErKeJXnMLuM.

Ronan O'Malley et al., "Vehicle Detection at Night Based on Tail-Light Detection", International Symposium on Vehicular Computing Systems, Trinity College Dublin, 2008.

* cited by examiner

METHOD AND CONTROL UNIT FOR RECOGNIZING A WEATHER CONDITION IN THE SURROUNDINGS OF A VEHICLE

FIELD OF THE INVENTION

The present invention relates to a method for recognizing a weather condition in the surroundings of a vehicle, a control unit for recognizing a weather condition in the surroundings of a vehicle, and a corresponding computer program product.

BACKGROUND INFORMATION

For camera-based hardware and software systems in a vehicle, it is of interest to know the current prevailing weather conditions such as rain, snow, wet roads, fog, water spray, dust, etc.

To this end, German Published Patent Appln. No. 10 2007 062 258 describes an optical rain sensor device for a motor vehicle.

SUMMARY

Against this background, the present invention presents a method for recognizing a weather condition in the surroundings of a vehicle, a control unit for recognizing a weather condition in the surroundings of a vehicle, and a corresponding computer program product.

Weather conditions in the surroundings of a vehicle, in particular on a roadway ahead of the vehicle, may have a lasting effect on the driving characteristics of the vehicle as well as the detection range for a driver of the vehicle. Existing vehicles may detect precipitation with a rain sensor, for example, and may adapt functions of the vehicle. The driver must recognize and appropriately respond to other weather conditions. In darkness, when the senses of the driver are already limited depending on the situation, timely recognition of weather conditions is problematic. Active safety systems in the vehicle such as ABS and ESP may respond to weather-related changes of the road only when the vehicle is already about to lose traction. Therefore, these systems are only able to react. The driver is always responsible for foresighted driving.

The present invention is based on the finding that in darkness, the field of vision of a driver of a vehicle has different characteristic features when various weather conditions such as rain, snow, fog, swirling dust, or dry weather prevail. The characteristic features in image information may be mapped by image detection of the driver's field of vision. In particular when the driver's field of vision is illuminated by at least one headlight, the weather conditions may trigger a weather-typical optical behavior as a characteristic feature. For objects having high reflectance or being at a light source, the light may be refracted by the prevailing weather conditions, thus triggering a weather-typical refraction behavior or scattering behavior as the characteristic feature.

An evaluation of the characteristic features of safety-relevant systems in the vehicle may advantageously provide parameters which may contribute to ensuring a higher level of safety. Likewise, with knowledge of the weather conditions, comfort/convenience systems may change and adapt the control parameters, for example to avoid misinterpretation of other information. In addition, optical detection systems may adapt image processing to the current weather conditions in order to improve object recognition and evaluation under various weather conditions.

The present invention provides a method for recognizing a weather condition in the surroundings of a vehicle, the method having the following steps:

ascertaining at least one imaging feature in a piece of image information, the image information representing a depiction of at least one area of the surroundings, and the imaging feature representing a light effect on a reflective or luminescent object in the area of the surroundings; and determining weather information for characterizing the weather condition based on a comparison between the imaging feature and at least one expected value.

A weather condition may be understood to mean an atmospheric phenomenon. For example, a weather condition may be fog, rain, fallen rain, snowfall, fallen snow, or also an absence thereof. Likewise, the weather condition may be a consequence of an atmospheric phenomenon. For example, wind may kick up dust or sand and blow it around. The surroundings of a vehicle may be the surroundings in the visibility range of the vehicle. In particular, the surroundings may be an area ahead of the vehicle which is directly or indirectly illuminatable by headlights of the vehicle. An imaging feature may be understood to mean, for example, a reduction in imaging quality of an object caused by at least one physical effect. For example, a contour of a traffic sign may have a blurred image, or a light may have a "corona" or a halo. Likewise, precipitation or condensed atmospheric moisture may be visible as an imaging feature in a headlight cone. Water crystals or water droplets may then reflect incident light to a great extent back toward the headlights. A piece of image information may be understood to mean an image file, for example a raster graphic. Pixels arrayed in a grid in a raster graphic may each represent one image point. An image point may have a brightness value and/or a color value. A light effect may be understood to mean, for example, a light refraction or a light diffraction or a light reflection or a light scattering on an object and/or a beam path from the headlight to the object and/or a beam path from the object to a lens. A reflective or luminescent object may be understood to mean, for example, a reflector, a roadway sign, a streetlight, a headlight, an ice crystal, a snowflake, a water droplet, a dust particle, an icy surface, or a water surface, among others. Weather information may be information which results from the current weather condition. For example, the weather information may be information concerning a visibility range or a roadway condition. An expected value may be understood to mean a stored value which has been recorded in the past as a prior imaging feature for a similar object and similar weather conditions. The expected value may thus be a brightness distribution, a shape, a dimension, or a configuration of a range of the image, or a combination thereof. A closest match may be found by making a comparison, and the weather condition associated with the selected expected value may be provided as weather information.

According to another specific embodiment of the present invention, the light effect may represent at least one light-dark gradient, and a scattering characteristic value and/or a refraction characteristic value of the light-dark gradient may be ascertained from the imaging feature in the ascertainment step, the scattering characteristic value representing a light scattering in an image range around the reflective or luminescent object, and the refraction characteristic value representing a light refraction in the image range around the reflective or luminescent object. In addition, the scattering characteristic value and/or the refraction characteristic value may be compared to at least one expected value of the scattering characteristic value and/or of the refraction characteristic value in the determination step. A light-dark gradient may be understood to mean a brightness gradient from a light point to an adjacent darker point. For example, a light-dark gradient between a white pixel and a black pixel is large. The light-dark gradient between a gray pixel and a dark gray pixel is small. For example, water droplets in air may refract light. The light-dark gradient at a boundary between, for example, a light source and a dark background is thus smaller than in clear air. Thus, from a driver's viewpoint in the vehicle, for example vehicle headlights of another vehicle have a so-called halo in fog. The halo becomes increasingly darker the farther the distance from the headlight. In this case, the light-dark gradient is therefore small. A scattering characteristic value may represent, for example, a variable of the halo. The denser the fog, the larger the halo may be. A halo may likewise be present on a back-reflecting object illuminated by the vehicle, such as a reflector. A refraction characteristic value may represent, for example, splitting of the light in the halo into spectral components. A large refraction characteristic value may indicate, for example, ice crystals in the air. An expected value of the scattering characteristic value may be a stored empirical value which represents a measure for a certain scattering. An expected value of the refraction characteristic value may be a stored empirical value which represents a measure for a certain refraction. In this way a weather condition, in particular at a fairly large distance ahead of the vehicle, may be recognized, and preventative measures may thus already be initiated.

In addition, the light effect may also represent at least one characteristic of a light spot which is produced at least by a light bundle emitted from a headlight of the vehicle. A position of the light spot may be ascertained from the imaging feature in the ascertainment step, and in addition the position may be compared to an expected value of the position in the determination step. A light spot may be understood to mean an area of high brightness which may be produced by a beam of a headlight. For example, the light spot may map a contour of a light bundle from the headlight. The light spot may be projected onto a road. However, the light spot may also "float" due to a reflection on particles ahead of the vehicle. A "floating" light spot may have some other shape than a projected light spot. Likewise, the "floating" light spot may be perceived at some other position than the projected light spot. A characteristic may represent a shape and position of the light spot. A position may indicate, for example, whether the light spot is projected onto the roadway and the roadway reflects the light back, or whether a major portion of the light is already reflected by particles. Particles may be dust, water droplets, or ice crystals, for example. An expected value of the position may be an empirical value which represents an expected position of the light spot under a certain weather condition. Fog in particular may be particularly easily and reliably recognized in this way.

According to another specific embodiment of the present invention, a height and a width of the light spot may also be ascertained from the imaging feature in the ascertainment step, the height representing an apparent vertical extension of the light spot and the width representing an apparent horizontal extension of the light spot. In addition, the height may be compared to an expected value of the height, and the width may be compared to an expected value of the width, in the determination step. A height and a width of the light spot may be understood to mean an apparent dimension of the light spot. For example, the height and/or the width may represent a countable number of pixels in a longitudinal and/or transverse orientation with respect to the vehicle. An expected value of the height and/or of the width may be an empirical value which represents an expected height and/or width of the light spot under a certain weather condition. Various weather conditions may be distinguished in a particularly simple manner by measuring the light spot, since the light spot changes its position relative to the vehicle only as a function of the weather conditions since the headlights are fixedly mounted on the vehicle.

In another specific embodiment, the light effect may represent at least one ground brightness, and a light distribution of the ground brightness may be ascertained from the imaging feature in the ascertainment step. In addition, the light distribution may be compared to an expected value of the light distribution in the determination step. A ground brightness may be understood to mean a brightness of the road which is perceivable from the vehicle. A light distribution may represent a perceivable distribution of light and dark locations on the roadway. For example, when the roadway is wet, only a small portion of the emitted light may be reflected back to the vehicle. A remainder of the emitted light which is directed from the wet roadway by total reflection may be reflected away from the vehicle. For a snow-covered roadway, a large portion of the emitted light may be diffusely reflected back to the vehicle over a large surface area. For a dry roadway, a moderate portion of the emitted light may be reflected back to the vehicle. For an oncoming vehicle the relationships may be reversed, since during rain the light that is reflected away by the oncoming vehicle as total reflection, corresponding to a direct headlight beam, may strike the host vehicle. In snow, the light may be diffusely reflected over a large surface area. An expected value of the light distribution may be an empirical value which represents an expected light distribution of the ground brightness under a certain weather condition. A road condition ahead of the vehicle may thus be detected as a particularly safety-relevant parameter, and corrective interventions by safety and comfort/convenience systems may be adapted and the driver of the vehicle may be made aware of same.

In an additional specific embodiment of the present invention, the light effect may represent at least one brightness in a lateral area near the ground, the lateral area being situated to the side of the vehicle, outside an area directly illuminated by headlights of the vehicle. A lateral area brightness value of the brightness may be ascertained from the imaging feature in the ascertainment step, and in addition the lateral area brightness value may be compared to an expected value of the lateral area brightness value in the determination step. A lateral area near the ground may be understood, for example, to mean a lane of the road adjacent to the lane of the host vehicle. Likewise, a lateral area near the ground may be understood to mean a soft shoulder or a hard shoulder of the road. The lateral area near the ground may be soiled, for example. Likewise, the lateral area near the ground may have accumulated snow. A lateral area brightness value may represent a brightness which is reflected from the lateral area. It may thus be recognized, for example, whether the roadway is soiled or covered with snow next to the lane of the host vehicle. An expected value of the lateral area brightness value may be an empirical value which represents an expected lateral area brightness value of the brightness in the lateral area near the ground under a certain weather condition.

In addition, according to another specific embodiment a further imaging feature in the image information may be ascertained in the ascertainment step, and the further imaging feature may represent a further light effect on a further reflective or luminescent object in the portion of the surroundings. The weather information may be determined based on a further comparison between the further imaging feature and at least one further expected value in the determination step. A prevailing weather condition may be determined with higher reliability by evaluating a further reflective or luminescent object. Prospective weather detection may be achieved by monitoring many objects, in particular objects located at a farther distance away. Vehicle safety may be significantly improved in this way.

According to another specific embodiment of the present invention, an additional imaging feature may be ascertained from additional image information in an additional ascertainment step, the additional image information representing an additional depiction of at least the portion of the surroundings at an additional point in time, and the additional imaging feature representing an additional light effect on the reflective or luminescent object in the portion of the surroundings at the additional point in time. The weather information may also be determined in the determination step based on an additional comparison between the additional imaging feature and the expected value or at least one additional expected value, in addition the weather information being determined based on a change between the comparison and the additional comparison. Continuous monitoring of changes may be achieved by tracking the reflective or luminescent object over multiple points in time. It is thus possible to monitor dynamic processes. For example, monitoring of an oncoming vehicle over multiple points in time may provide information concerning the road, which is not yet illuminatable by the headlights of the host vehicle.

Moreover, the present invention provides a control unit for recognizing a weather condition in the surroundings of a vehicle, the control unit having a device for ascertaining an imaging feature in a piece of image information, the image information representing a depiction at least of a portion of the surroundings, and the imaging feature representing a light effect on a reflective or luminescent object in the portion of the surroundings. In addition, the control unit has a device for determining weather information for characterizing the weather condition based on a comparison between the imaging feature and at least one expected value. The object of the present invention may also be quickly and efficiently achieved by this embodiment variant of the present invention in the form of a control unit.

In the present context, a control unit may be understood to mean an electrical device which processes sensor signals and outputs control signals as a function thereof. The control unit may have an interface which may be designed as hardware and/or software. In a hardware design, the interfaces may be part of a so-called system ASIC, for example, which contains various functions of the control unit. However, it is also possible for the interfaces to be dedicated integrated circuits or to be composed, at least partially, of discrete components. In a software design, the interfaces may be software modules which are situated, for example, on a microcontroller in addition to other software modules.

Also advantageous is a computer program product having program code which may be stored on a machine-readable carrier such as a semiconductor memory, a hard drive memory, or an optical memory and used for carrying out the method according to one of the above-described specific embodiments when the program is executed on a device which corresponds to a computer.

DETAILED DESCRIPTION

In the following description of preferred exemplary embodiments of the present invention, the same or similar reference numerals are used for the elements which are illustrated in the various figures and which have a similar action; a repeated description of these elements is dispensed with.

Figure 1:
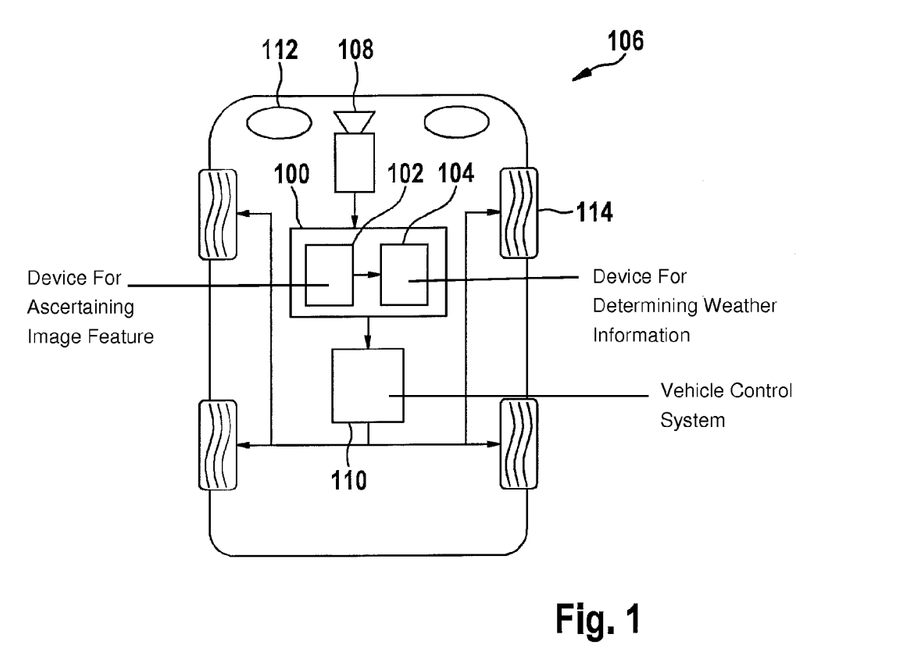
FIG. 1 shows an illustration of a vehicle having a control unit for recognizing a weather condition in the surroundings of a vehicle according to one exemplary embodiment of the present invention.

FIG. 1 shows an illustration of a vehicle having a control unit 100 for recognizing a weather condition in the surroundings of a vehicle according to one exemplary embodiment of the present invention. Control unit 100 has a device 102 for ascertaining an imaging feature in a piece of image information, and a device 104 for determining weather information for characterizing the weather condition. Vehicle 106 has a surroundings detection device 108 as well as a vehicle control system 110. In addition, vehicle 106 has two headlights 112 for illuminating a portion of the surroundings ahead of vehicle 106.

Surroundings detection device 108 is designed to detect at least the portion of the surroundings illuminated by headlights 112. Surroundings detection device 108 may also detect a fairly large range ahead of vehicle 106. Surroundings detection device 108 generates the image information and provides it for other devices in vehicle 106. Control unit 100 is designed to receive the image information. Device 102 is designed to ascertain at least one imaging feature in the image information. An imaging feature may in particular be a characteristic light distribution or a characteristic light effect on an object which is illuminated by headlights 112, or a luminescent object, which may be another headlight. Thus, for example, snow, rain, dust, or fog may reflect light from headlights 112 to surroundings detection device 108. Likewise, reflectors which are illuminated by headlights 112 may act as a luminescent object. Weather conditions in the direct light path between the reflector and surroundings detection device 108 may, for example, scatter, refract, or attenuate the light. An image of the reflector may degrade, i.e., be depicted in a distorted or blurred manner. If another light source, for example a streetlight or a headlight of an oncoming vehicle, illuminates the surroundings ahead of vehicle 106, weather conditions may cause light effects which do not correspond to the expected surroundings of vehicle 106. For example, for a dry road the surroundings around the other light source would be only moderately illuminated. Snow or fog changes a light distribution of the other light source. Snow reflects incident light almost completely, but in a diffuse manner, so that the surroundings around the other light source appear brighter. Fog scatters and refracts light, so that an area around the other light source appears flatly illuminated. Control unit 100 ascertains such light effects as an imaging feature in device 102, and compares this imaging feature in device 104 to at least one expected value. An expected value represents optical features of a light effect associated with a weather condition. Weather information which characterizes the weather condition may thus be associated with the imaging feature in device 104. Based on the weather information, vehicle control system 110 may change vehicle parameters in order to respond to the current weather condition. In this exemplary embodiment, vehicle control system 110 changes parameters for a vehicle drive 114. Corresponding to a road condition, for example, a maximum drive torque for wheels 114 may be determined.

For camera-based hardware systems and software systems in vehicle 106, it is of interest to know currently prevailing weather conditions such as rain, snow, wet roadways, fog, water spray, dust, etc. Although driving dynamics systems such as ESP 110 could make use of this knowledge in order to use other control parameters, video-based systems 208 could deactivate certain functions or degrade them in a defined manner, or adapt parameters to preprocessing in a targeted manner, in order to ensure the highest possible availability of the systems. For example, staying in the lane on snow-covered roads is not easily possible. At night it is generally more difficult for camera-based software systems to recognize weather conditions, since, for example, the sky is not visible, the visibility range is possibly less than 50 m, or the road pavement is unknown. For the case that bright objects of various types, for example luminescent objects or reflective objects, are present in the image, image features of these objects may provide information concerning the specific prevailing weather conditions.

Figure 2:
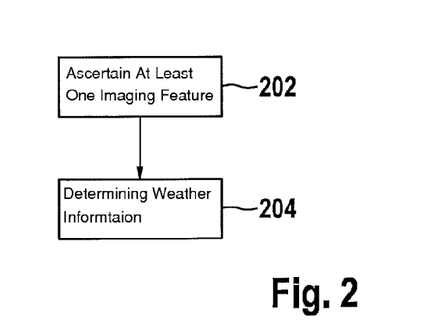
FIG. 2 shows a flow chart of a method for recognizing a weather condition in the surroundings of a vehicle according to one exemplary embodiment of the present invention.

FIG. 2 shows a flow chart of a method for recognizing a weather condition in these surroundings of a vehicle according to one exemplary embodiment of the present invention. The method may be carried out, for example, on a control unit 100 as illustrated in FIG. 2.

The method has a step 202 of ascertaining at least one imaging feature in a piece of image information, and a step 204 of determining weather information for characterizing the weather condition.

An imaging feature in a piece of image information is ascertained in step 202. The image information represents a depiction of at least a portion of the surroundings of the vehicle. The imaging feature represents a light effect on a reflective or luminescent object in the portion of the surroundings. The image information may be received by a camera, for example. The camera may be mounted on the vehicle and may detect the surroundings ahead of the vehicle. The imaging feature may be part of the image information. If weather conditions change a beam path from an object to the camera, an image of the object may have a different shape than in the absence of the weather conditions. This may be recognizable in a particularly clear manner when a bright light beam penetrates through the "weather." Particles such as water droplets, ice crystals, or dust may then produce optical effects which may blur the image of the object. Another effect may occur when the weather conditions make the surroundings ahead of the vehicle highly reflective due to snow or rain, for example. Light which normally would not reach the camera directly may then be reflected onto the camera and blind it. For example, subareas of the image information may thus be overexposed and a large part of their contained information lost. Such examples of optical effects may be ascertained in step 202 as an imaging feature.

The imaging feature is compared to at least one expected value in step 204. The expected value may be an image of the imaging feature for a similar weather condition. A corresponding piece of weather information may thus be associated with the imaging feature. The weather information may characterize the current weather condition. Based on the weather information, a vehicle control system may preventively adapt control parameters to the current weather condition. The imaging feature may be compared to a plurality of expected values in step 204. Each of the expected values may represent a different weather condition and be associated with a different piece of weather information.

FIGS. 3 through 10 show camera images of various weather conditions at night. The camera images show a driver's field of vision ahead of a vehicle. The driver's field of vision is illuminated by headlights of the vehicle. Various reflective or emitting light objects are represented in the camera images. Therefore, recognition of weather conditions at night is described with reference to luminescent and reflective objects. An estimation of the currently prevailing weather condition is based on a determination of characteristic features for reflective as well as luminescent light objects. These may be, for example, headlights and lights of other traffic, reflectors illuminated by the light from the host vehicle's headlights, as well as an illuminated area of the road directly ahead of the vehicle. The features of these light objects, such as maximum brightness, gray value pattern, color, gradient pattern, and the like have defined characteristics under normal weather conditions. These characteristics may be described as feature ranges. If the weather conditions deviate from the "normal case" or if the weather conditions change due to, for example, onset of rain, a fog bank, soiled roadway, etc., the change is reflected in altered feature ranges. Features "degrade," and this change in the various feature ranges provides a direct indication of the specific weather condition.

Thus, the evaluation or taking into account of the following features is advantageous for the weather situations discussed below as examples. An image having fog, for example, may have a large-surface, flat gradient pattern and may be comparatively dark. Rain may cause, for example, degraded, elongated object shapes and an occasionally intense gradient pattern in an image. An image having rain may have an irregular brightness pattern. Snow on the roadside may be imaged, for example, as many small, bright objects. Snow may "glisten" due to reflective facets on ice crystals, and highly variable gradient features may appear. Due to the white color of snow, color information may be absent. Snow, dust, or the like on the roadway may cause, for example, apparent or virtual large opaque objects directly ahead of the host vehicle, and irregular gradient features may appear. It is generally advantageous to analyze the surface ahead of the host vehicle in greater detail, regardless of the object.

To improve the robustness of the proposed approach, an analysis of feature changes for a plurality or all objects in an image is advantageous. It may thus be recognized, for example, whether a windshield wiper has just moved through the image and concealed a portion of the image information. In another variant for increasing the robustness, the analysis of the weather conditions is not just carried out for each image, but, rather, the analysis of the feature patterns or feature changes is carried out over multiple images. Recognized objects may be associated with tracks, which may be analyzed over multiple images. This is understood to mean, for example, the time at which an object has been detected for the first time and the nature of the feature pattern over time or the covered distance.

Figure 3:
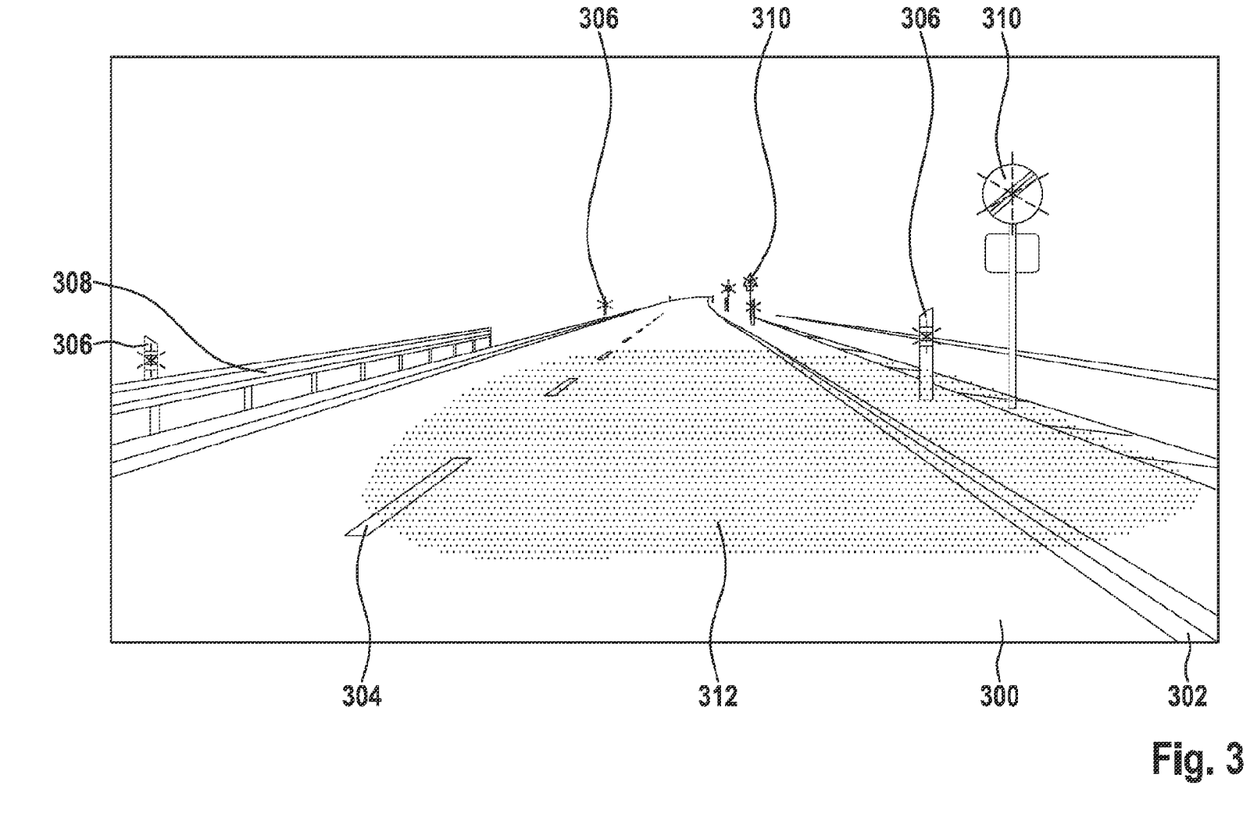
FIG. 3 to FIG. 10 show illustrations of image information concerning a road in darkness and under various weather conditions.

FIG. 3 shows an image of a driver's field of vision in dry weather. The driver's field of vision is partially illuminated by light from headlights of a vehicle. A straight course of a road 300 having one lane in each direction is visible for a distance ahead of the vehicle until the light is no longer sufficient to illuminate road 300. Roadway 300 has reflective roadway markings 302, 304 on a dark roadway pavement and roadway guides 306, 308. The right roadside has a solid side marking 302. The middle of the roadway has a broken-line center marking 304. An area at the right side of road 300 has vegetation, and also has black and white reflector posts 306 having oblong reflectors. In addition, the area at the right side of the roadway has reflective roadway signs 310. An area at the left side of roadway 300 has black and white reflector posts 306 having two punctiform reflectors each. In addition, the area on the left side has a side guardrail 308. A lower light-dark boundary of a light cone of the headlights is discernible on road 300 in a close range ahead of the vehicle. Beginning at the light-dark boundary, the directional lane on which the vehicle is situated is brightly illuminated. The intensity of the illumination decreases with increasing distance from the vehicle. The area at the right side is likewise brightly illuminated beginning at the light-dark boundary. Here as well, the intensity of the illumination decreases with increasing distance from the vehicle.

The other directional lane is only partially brightly illuminated. The image shows a light spot 312 ahead of the vehicle which is characteristic of dry weather. Reflective objects 302, 304, 306, 310 in the image are recognizable up to a large distance ahead of the vehicle. In the approach presented here, brightly illuminated subareas 312 and reflective objects 302, 304, 306, 310 in the image are evaluated. As illustrated in FIG. 3, a sharp light-dark transition to imaged reflective objects 302, 304, 306, 310 is characteristic of dry weather. In addition, imaging features which are described with reference to the subsequent figures are not present. This weather condition may be recognized, for example, by checking whether light spot 312 is present in a defined range ahead of the vehicle, and whether very bright image areas have a very sharp transition to adjacent dark image areas.

Figure 4:
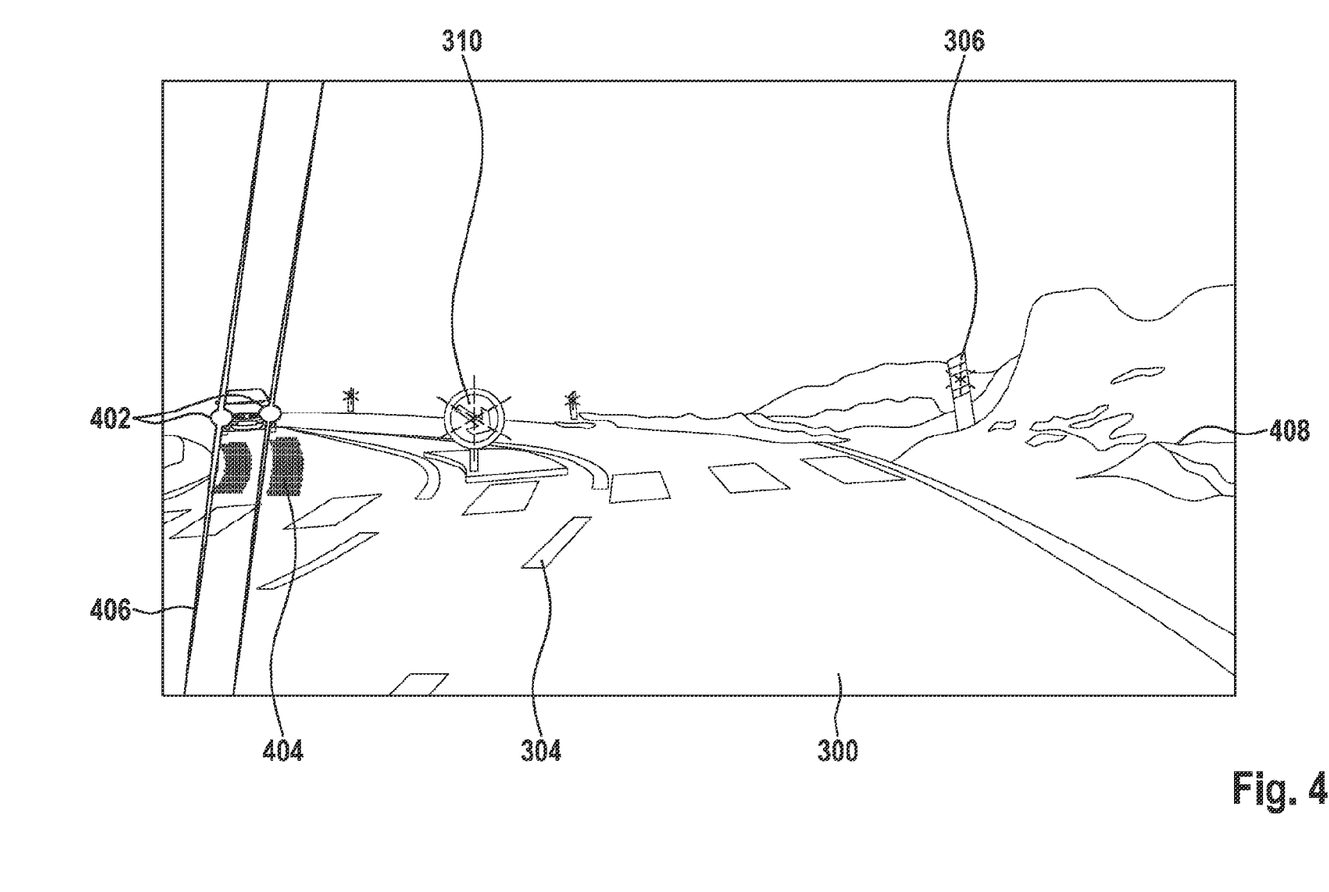

FIG. 4 shows an image of a driver's field of vision in wet weather. The same as in FIG. 3, the driver's field of vision is partially illuminated by light from headlights of a host vehicle. Road 300 runs ahead of the host vehicle in a left-hand curve. A traffic island having a traffic sign 310 "Keep right" and a pedestrian crosswalk (zebra stripes) perpendicular to road 300 are situated in the left-hand curve. Road 300 likewise has reflective objects 304, 306, 310 on the roadway and in an area at the right side as well as in a middle area. Road 300 is wet, and therefore the road pavement reflects only a small portion of the light from the headlights back to the vehicle. No light spot is recognizable ahead of the host vehicle, as illustrated in FIG. 3. Road 300 is recognizable only by virtue of reflective objects 304, 306, 310 and the pedestrian crosswalk. Two very bright luminescent objects 402 are depicted in the other directional lane Luminescent objects 402 represent two headlights 402 of an oncoming vehicle. Luminescent objects 402 are illustrated as two very bright image areas of equal size which are separated at a distance from one another at approximately the same height. The oncoming vehicle is not recognizable. Two highly reflective bright surfaces 404 which reflect light from the two headlights 402 directly onto the host vehicle are situated on road 300 ahead of the oncoming vehicle, beneath luminescent objects 402. The light from the two headlights 402 is scattered by windshield wiper streaks on the windshield of the host vehicle. Luminescent objects 402 therefore have so-called "lightsabers" 406. A right roadside 408 of road 300 is covered with snow, and reflects a portion of the light from the headlights back to the host vehicle. Due to the absence of a light spot ahead of the host vehicle and the imaging features "reflective surfaces" 404 beneath luminescent objects 402, "lightsabers" 406 emanating from luminescent objects 402, and "increased light reflections on the roadside" 408, it may be recognized by using a method according to one exemplary embodiment of the present invention that road 300 is wet, and precipitation is causing the windshield wiper streaks on the windshield. In addition, it may be recognized that snow is present and that frozen moisture may be expected. This weather information may be processed in a vehicle control system of the host vehicle in order to adapt parameters of the vehicle control system to the current weather conditions.

Figure 5:
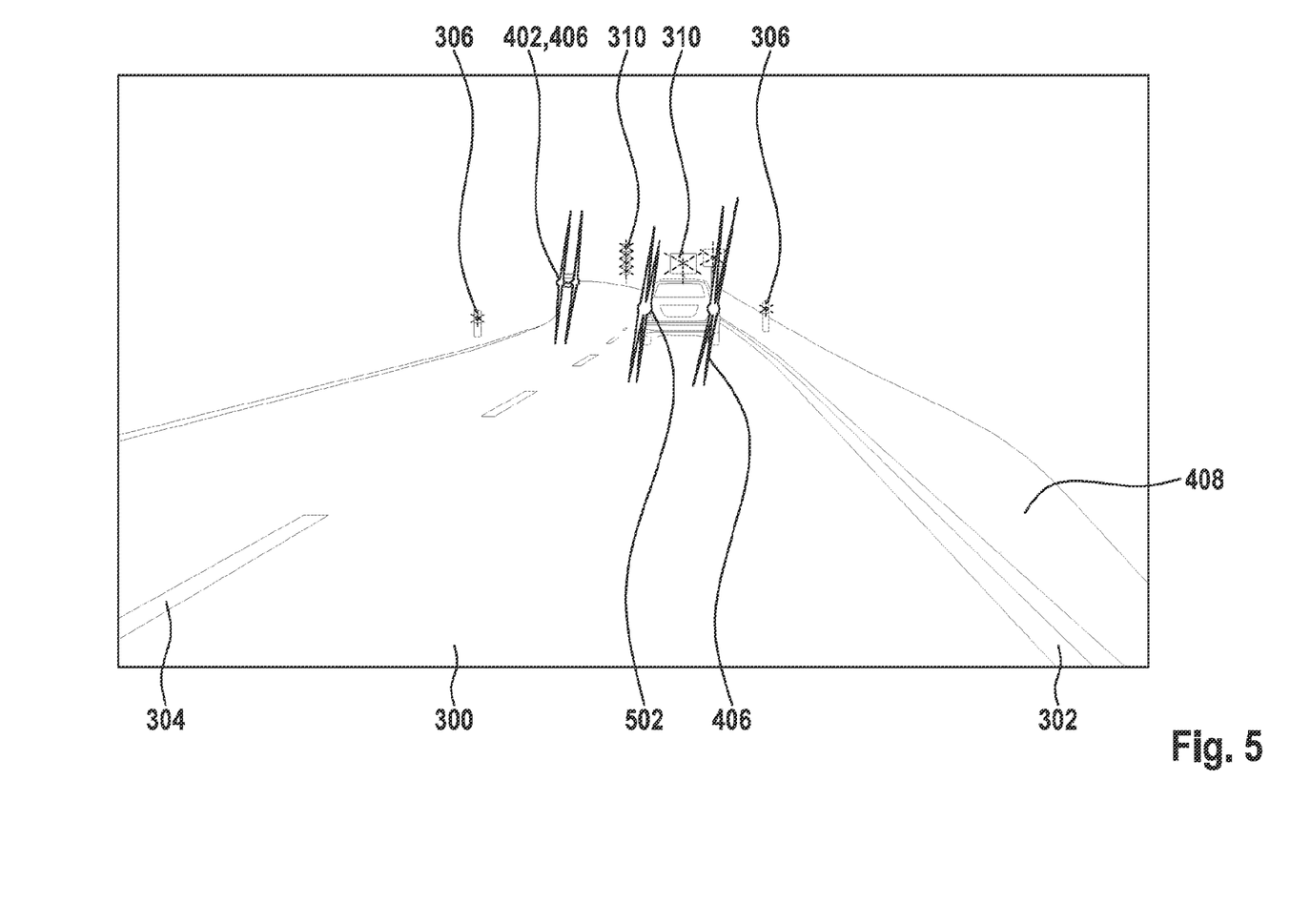

FIG. 5 shows another image of a driver's field of vision in wet weather. The same as in FIG. 3, the driver's field of vision is partially illuminated by light from headlights of a host vehicle. The same as in FIG. 3, road 300 has reflective objects 302, 304, 306, 310 on the roadway and in an area at the right side. Road 300 is wet, and therefore the roadway pavement reflects only a small portion of the light from the headlights back to the vehicle. No light spot is recognizable ahead of the host vehicle, as illustrated in FIG. 3. Road 300 is recognizable only by virtue of reflective objects 302, 304, 306, 310. A preceding vehicle is depicted in the directional lane ahead of the host vehicle. Two tail lights 502 of the preceding vehicle are recognizable as bright light points 502. Radiated light from tail lights 502 is scattered by windshield wiper streaks on the windshield of the host vehicle. Bright light points 502 therefore have so-called lightsabers 406. Two very bright luminescent objects 402 are depicted in the other directional lane. Luminescent objects 402 represent two headlights 402 of an oncoming vehicle. The oncoming vehicle is not recognizable. The light from the two headlights 402 is likewise scattered by the windshield wiper streaks on the windshield of the host vehicle. Luminescent objects 402 therefore also have lightsabers 406. A right roadside 408 of road 300 is covered with snow, and diffusely reflects a portion of the light from the headlights back to the host vehicle. Due to the absence of a light spot ahead of the host vehicle and the imaging features "lightsaber" 406 as well as "increased light reflections on the roadside" 408, it may be recognized by using a method according to one exemplary embodiment of the present invention that road 300 is wet, and precipitation is causing the windshield wiper streaks on the windshield. In addition, it may be recognized that snow is present and that frozen moisture may be expected. This weather information may be processed in a vehicle control system of the host vehicle in order to adapt parameters of the vehicle control system to the prevailing weather conditions.

Figure 6:
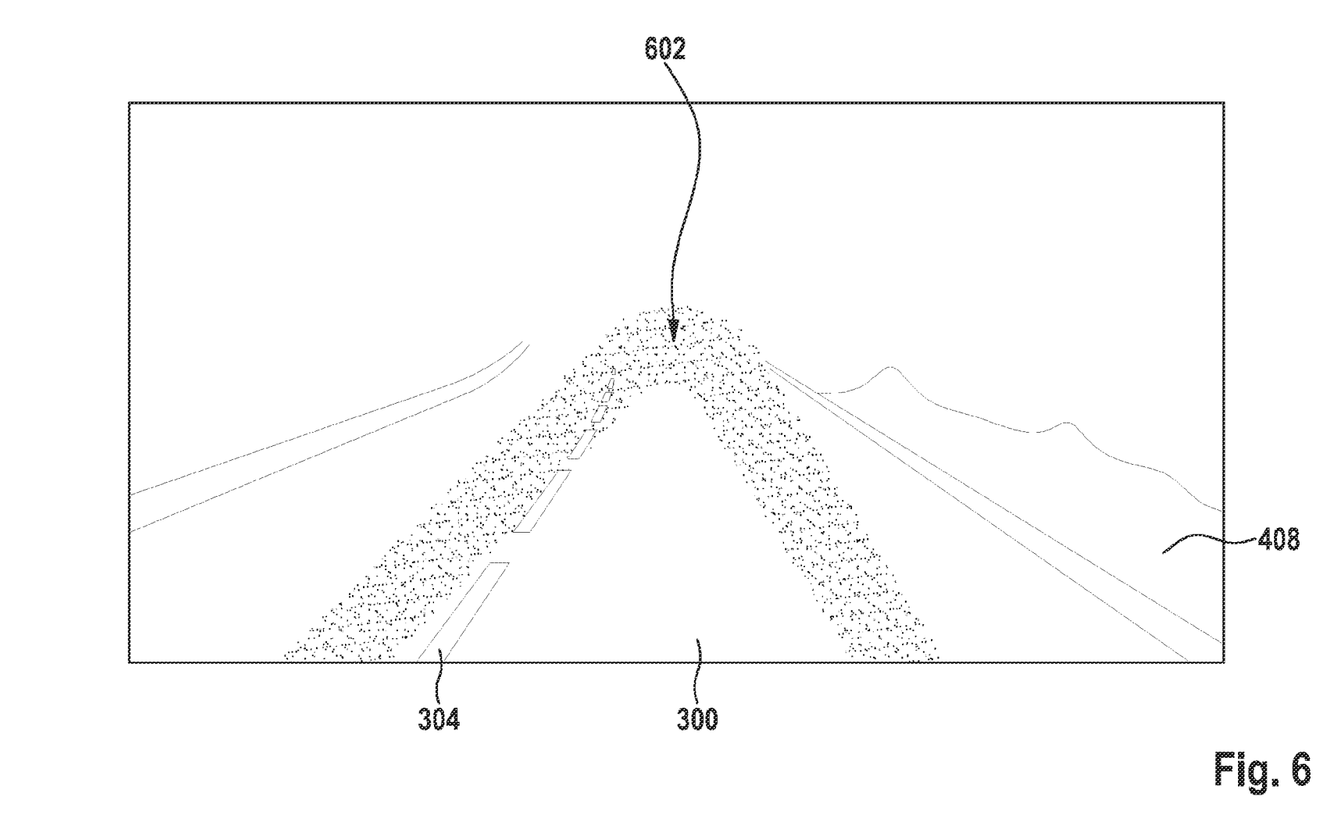
Figure 7:
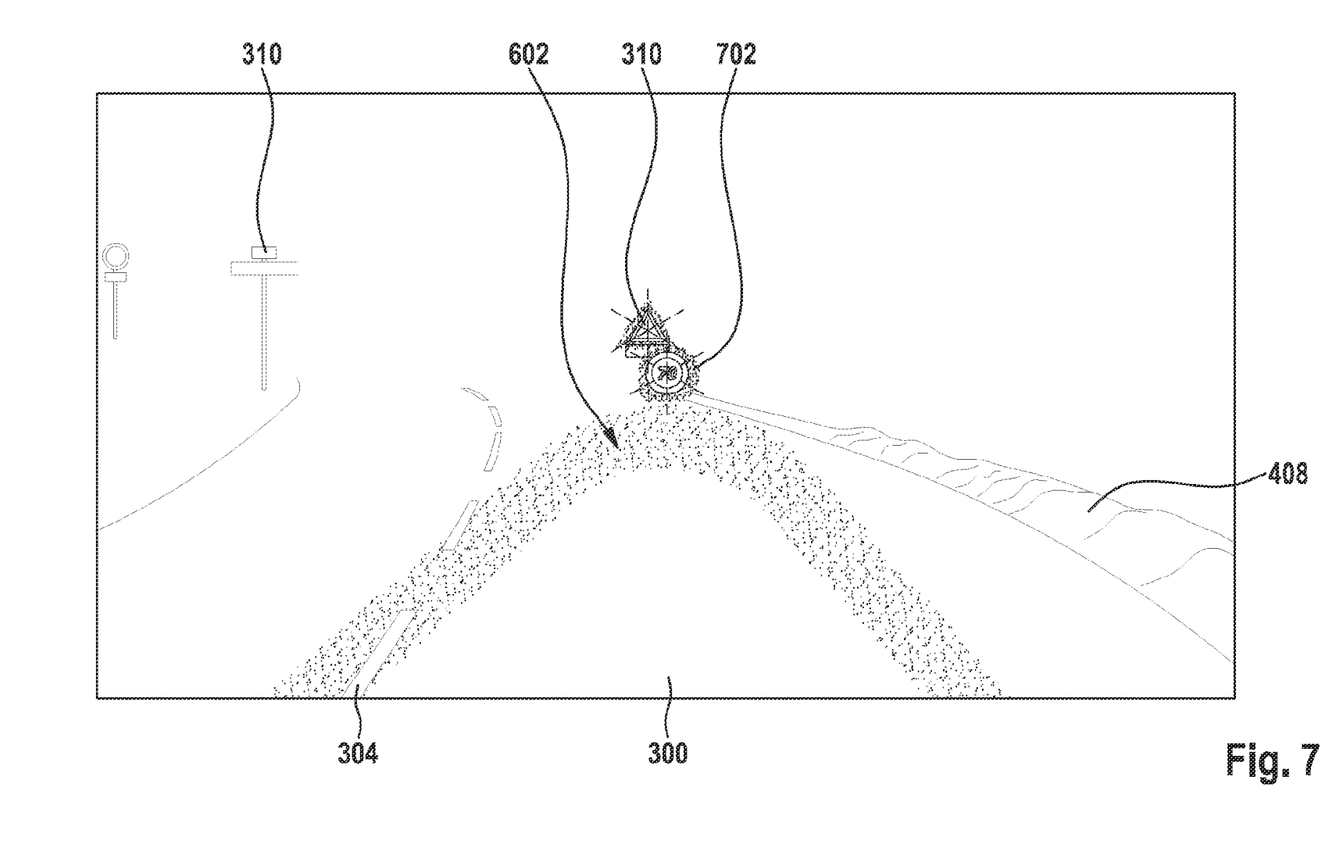
Figure 8:
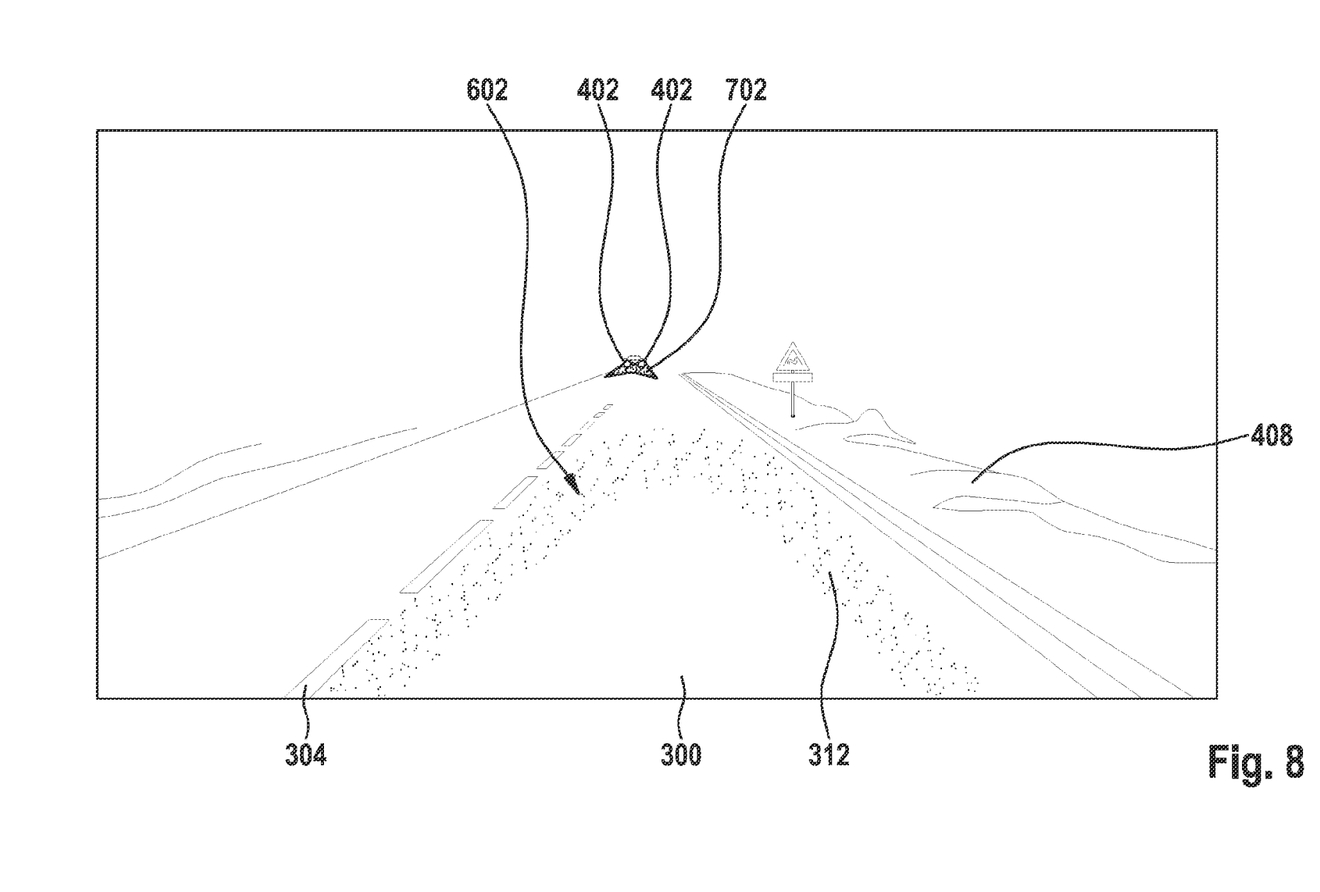

FIGS. 6, 7, and 8 show images of a driver's field of vision in fog. The same as in FIG. 3, a road 300 ahead of a host vehicle is illuminated by light from headlights of the host vehicle. Road 300 has a broken-line center marking 304. A right roadside 408 is covered with snow, and reflects diffused light from the headlights of the host vehicle.

In FIG. 6, water droplets or very fine ice crystals in the air ahead of the host vehicle are illuminated by the headlights and reflect a portion of the light from the headlights back to the host vehicle. Headlight cones 602 of the headlights of the host vehicle are thus recognizable. The light spot on the roadway surface of road 300 is covered by the apparently floating headlight cones 602 due to the brightness of the light phenomenon of headlight cones 602. Despite its reflective properties, center marking 304 is only slightly more recognizable than right roadside 408. The fog delimits a visibility range. Fog may be recognized by checking whether headlight cones 602 are recognizable in the image in a known illumination range of the headlights.

In addition to headlight cones 602, as depicted in FIG. 6, reflective traffic signs 310 next to road 300 on the right side are discernible in FIG. 7. A first group of traffic signs 310 is directly illuminated by the headlights of the host vehicle, and reflect a large quantity of light back to the host vehicle. These traffic signs 310 therefore act as an intense light source which emits a light beam to the host vehicle. The light beam is refracted and scattered by the floating water droplets or the ice crystals. Traffic signs 310 are therefore surrounded by a luminous ring or halo 702. Halo 702 is brighter than headlight cones 602. In another group of traffic signs 310 which are not directly illuminated, the reflected quantity of light is not sufficient to cause a halo 702.

Two bright light points 402 are depicted in the other directional lane of road 300 in FIG. 8. Bright light points 102 represent two headlights 402 of an oncoming vehicle. The light beams from headlights 402, which are directed straight at the host vehicle, are also refracted and scattered by the floating ice and/or water particles. Bright light points 102 are thus likewise each surrounded by a halo 702. The fog is less dense than in FIG. 6 and FIG. 7. Headlight cones 602 are therefore less pronounced, and the headlights of the host vehicle generate light spot 312 on the roadway surface. Depicted next to road 300 on the right side is a traffic sign, which does not reflect sufficient light to the host vehicle to have a halo.

Based on the imaging features of headlight cones 602 and halo 702, the method presented here may determine weather information "fog," and may generate weather information "prospective visibility range" by comparing actual light spot 312 to an expected light spot 312. Based on this weather information, a vehicle control system of the host vehicle may adapt parameters, for example a light distribution ahead of the vehicle, to the actual weather conditions. Visibility for the driver of the host vehicle may be improved in this way.

Figure 9:
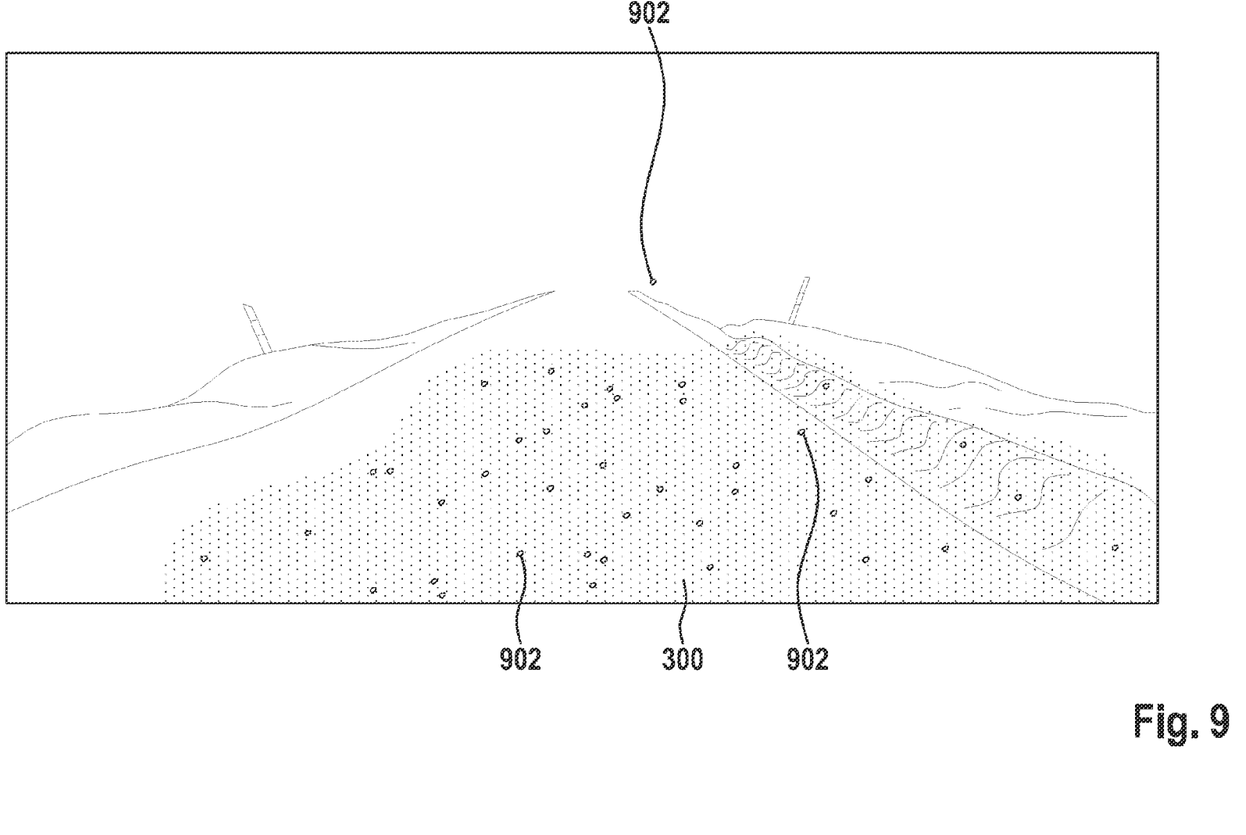
Figure 10:
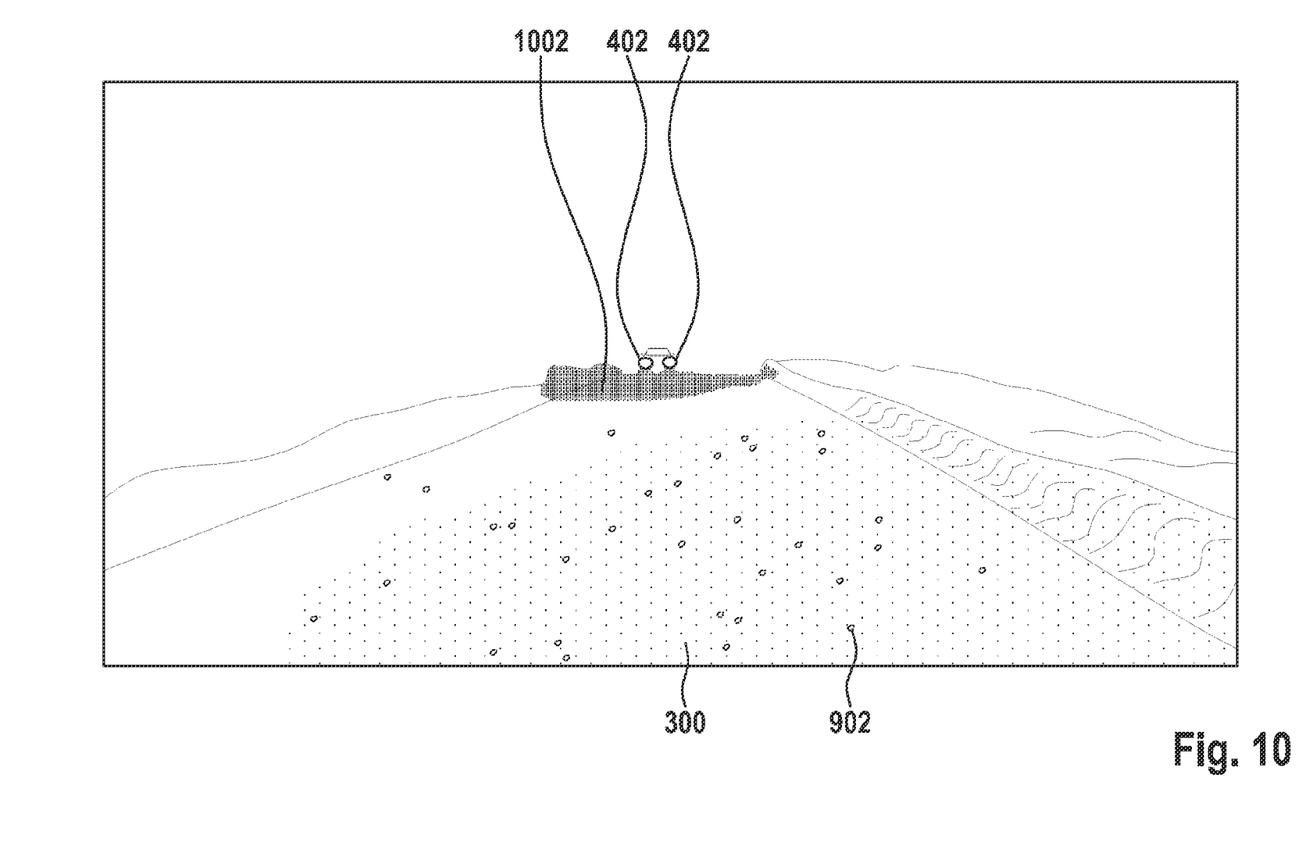

FIGS. 9 and 10 show a driver's field of vision for a snow-covered road 300 and snowfall. A wide area of road 300 ahead of the host vehicle is illuminated, and diffusely reflects light from the headlights of the host vehicle over a large area back to the host vehicle. Snow is piled up on the right and left roadsides, and due to a more favorable angle of incident light, the headlights of the host vehicle reflect more light back to the host vehicle than does the snow-covered roadway.

In FIG. 9, the headlights of the host vehicle illuminate individual snowflakes 902 in the air ahead of the vehicle. Snowflakes 902 appear as bright white points in the image. Another vehicle approaches the host vehicle in FIG. 10. Headlights 402 of the other vehicle illuminate the snow-covered roadway very brightly ahead of the other vehicle. This portion of the driver's field of vision in FIG. 10 is therefore overexposed and appears as an amorphous white surface 1002. Based on the characteristic light distribution on roadway 300 ahead of the host vehicle for a snow-covered roadway, or also based on overexposed surface 1002 ahead of the oncoming vehicle, the method presented here may determine weather information "snow on the roadway." The density of the snowfall, and thus weather information "prospective visibility range," may be deduced by evaluating a number of snowflakes 902 in the light from the headlights.

Figure 11:
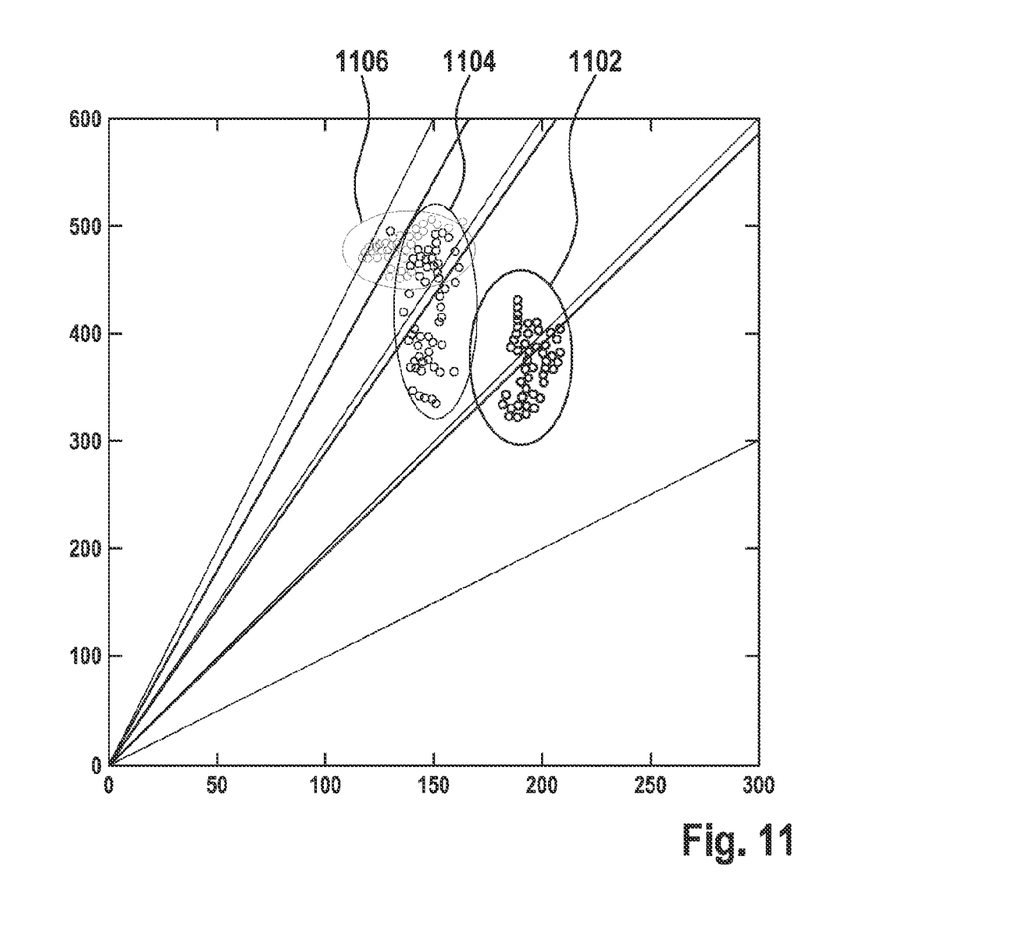
FIG. 11 shows a diagram of a change in an imaging feature in multiple pieces of image information concerning a road in darkness and under various weather conditions.

FIG. 11 shows an example of results of a changed feature space for a light spot ahead of the vehicle in three different weather situations. A configuration 1102 of the light spot in clear air, a configuration 1104 of the light spot in light fog, and a configuration 1106 of the light spot in fog are shown. The width of the light spot in a camera image is plotted on the abscissa, and the height of the light spot in the camera image is plotted on the ordinate. The light spot has a different position, shape, and dimension, depending on the weather situation.

Without reflective particles in the air ahead of the vehicle, in clear air the beam of the headlights strikes the roadway surface. Due to unevennesses of the roadway, the measured height as well as the measured width of the light spot has a fluctuation range. Since the roadway surface reflects only light in the center of the headlight beam with high intensity back to the vehicle, the light spot appears to be narrow. In light fog, particles in the air ahead of the vehicle are already illuminated by the beam of the headlights, and make the beam visible. The light spot appears at different heights ahead of the vehicle, depending on the density of the fog. Since the fog also reflects light at low intensity from lateral areas of the headlight beam, in light fog the light spot appears to be wider than the light spot in clear air. The width of the light spot in light fog is subject to a great fluctuation range. In fog, only a small portion of the light still strikes the roadway. A large portion of the light is already reflected by the particles in the air, and causes the light spot to float at a high level ahead of the vehicle. Since the fog also reflects very weak light back to the vehicle, and therefore portions of the light beam are also visible which do not cause a light spot on the roadway in clear air, the light spot appears to be very wide. Weather information "dense fog," for example, may be determined by evaluating the height and the width of the light spots using the method presented here.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment. Furthermore, method steps according to the present invention may be repeated, and carried out in a sequence different from that described.

What is claimed is:

1. A method for recognizing a weather condition in surroundings of a vehicle, comprising:
   emitting a light bundle from a headlight of the vehicle;
   capturing, by an image capture device of the vehicle, a plurality of images of a surroundings of the vehicle;
   ascertaining, by a processing device of the vehicle in the images of the surroundings, light spots that are produced in response to the emitted light bundle, and a height and a width of the light spots, the height representing an apparent vertical size of the light spot and the width representing an apparent horizontal size of the light spot, the light spots including reflections of the emitted light bundle from at least one of: a road in front of the vehicle, or a space above the road in front of the vehicle;
   determining, by the processing device, weather information for characterizing the weather condition based on a comparison of the ascertained height of the light spots to a plurality of different expected height value ranges and of the ascertained width of the light spots to a plurality of different expected width value ranges; and controlling, using a vehicle control system, operation of a vehicle system based on the determined weather information, the vehicle system including at least one of: an anti-lock braking system, an electronic stability program system, or an optical detection system.

2. The method as recited in claim 1, further comprising ascertaining a light effect in the images, wherein:
the light effect represents at least one light-dark gradient,
at least one of a scattering characteristic value and a refraction characteristic value is ascertained from the imaging feature of the light-dark gradient in the ascertaining step,
the scattering characteristic value represents a light scattering in an image range around the one of the reflective object and the luminescent object, and
the refraction characteristic value represents a light refraction in the image range around the one of the reflective object and the luminescent object
the at least one of the scattering characteristic value and the refraction characteristic value is compared to at least one of an expected value of the at least one of the scattering characteristic value and an expected value of the refraction characteristic value in the determining step.

3. The method as recited in claim 1, wherein positions of the light spots are ascertained in the ascertaining step, and the positions are compared to expected value ranges in the determining step.

4. The method as recited in claim 1, further comprising ascertaining a light effect in the images, wherein:
the light effect represents at least one ground brightness,
a light distribution of the ground brightness is ascertained from the imaging feature in the ascertaining step, and
the light distribution is compared to an expected value of the light distribution in the determining step.

5. The method as recited in claim 1, further comprising ascertaining a light effect in the images, wherein:
the light effect represents at least one brightness in a lateral area near the ground, the lateral area being situated to a side of the vehicle, outside an area directly illuminated by headlights of the vehicle, and
a lateral area brightness value of the brightness is ascertained from the imaging feature in the ascertaining step, and
the lateral area brightness value is compared to an expected value of the lateral area brightness value in the determining step.

6. The method as recited in claim 1, further comprising:
ascertaining in the ascertaining step a further imaging feature in the image information, the further imaging feature representing a further light effect on one of a further reflective object and a further luminescent object in a portion of the surroundings; and
determining the weather information based on a further comparison between the further imaging feature and at least one further expected value in the determining step.

7. The method as recited in claim 1, further comprising:
ascertaining at least one additional imaging feature from additional image information in an additional ascertaining step, the additional image information representing an additional depiction of at least the area of the surroundings at an additional point in time, and the additional imaging feature representing an additional light effect on the one of the reflective object and the luminescent object in the area of the surroundings at the additional point in time; and
determining the weather information in the determining step based on an additional comparison between the additional imaging feature and at least one additional expected value, the weather information being determined based on a change between the comparison and the additional comparison.

8. A control unit for a vehicle, the control unit comprising:
a processing unit; and
a non-transitory machine-readable storage medium having program instructions, which when executed by the processing unit perform a method of recognizing a weather condition in surroundings of the vehicle, the method including:
receiving from an image capture device of the vehicle a plurality of images of the surroundings of the vehicle while a headlight of the vehicle emits a light bundle;
ascertaining in the images of the surroundings light spots that are produced in response to the emitted light bundle, and a height and a width of the light spots, the height representing an apparent vertical size of the light spot and the width representing an apparent horizontal size of the light spot, the light spots including reflections of the emitted light bundle from at least one of: a road in front of the vehicle, or a space above the road in front of the vehicle;
determining weather information for characterizing the weather condition based on a comparison of the ascertained height of the light spots to a plurality of different expected height value ranges and of the ascertained width of the light spots to a plurality of different expected width value ranges; and
controlling operation of a vehicle system based on the determined weather information, the vehicle system including at least one of: an anti-lock braking system, an electronic stability program system, or an optical detection system.

9. A non-transitory machine-readable storage medium having program instructions, which when executed by a processor perform a method for recognizing a weather condition in surroundings of a vehicle, the method comprising:
emitting a light bundle from a headlight of the vehicle;
capturing, by an image capture device of the vehicle, a plurality of images of the surroundings of the vehicle;
ascertaining in the images of the surroundings light spots that are produced in response to the emitted light bundle, and a height and a width of the light spots, the height representing an apparent vertical size of the light spot and the width representing an apparent horizontal size of the light spot, the light spots including reflections of the emitted light bundle from at least one of: a road in front of the vehicle, or a space above the road in front of the vehicle;
determining weather information for characterizing the weather condition based on a comparison of the height of the light spots to a plurality of different expected height value ranges and of the ascertained width of the light spots to a plurality of different expected width value ranges; and
controlling, using a vehicle control system, operation of a vehicle system based on the determined weather information, the vehicle system including at least one of: an anti-lock braking system, an electronic stability program system, or an optical detection system.

10. The method as recited in claim 1, further comprising, based on the weather condition, at least one of:
   deactivating a function of a video-based system on board the vehicle,
   degrading the function of the video-based system on board the vehicle, and
   adapting a light distribution, using the headlight, ahead of the vehicle.

11. The method as recited in claim 1, wherein one of the height and the width represents a number of pixels in one of a longitudinal orientation and a transverse orientation to the vehicle.

12. The method as recited in claim 1, further comprising:
   plotting, over time, the width of the light spots on an abscissa of a plot and the height of the light spots on an ordinate of the plot; and
   determining the weather information by comparing the plot over time to the expected value ranges.

13. The method as recited in claim 1, wherein the expected height and width value ranges correspond to a plurality of different weather conditions.

14. The method as recited in claim 13, wherein the determining selects a specific one of the plurality of weather conditions corresponding to specific expected height and width values having a closest match to the ascertained height and width values.

15. The method as recited in claim 1, wherein ascertaining the height and width of the light spot includes counting a number of pixels in the image corresponding to the light spot in a longitudinal direction and a transverse direction with respect to the vehicle.

16. The control unit as recited in claim 8, wherein:
   a position of the light spot is ascertained from the imaging feature in the ascertaining step, and
   the position is compared to an expected value of the position in the determining step.

17. The control unit as recited in claim 8, wherein the expected height and width value ranges correspond to a plurality of different weather conditions.

18. The non-transitory machine-readable storage medium as recited in claim 9, wherein:
   a position of the light spot is ascertained from the imaging feature in the ascertaining step, and
   the position is compared to an expected value of the position in the determining step.

19. The non-transitory machine-readable storage medium as recited in claim 9, wherein the expected height and width value ranges correspond to a plurality of different weather conditions.

* * * * *